(12) United States Patent
Pepi et al.

(10) Patent No.: US 6,428,272 B1
(45) Date of Patent: *Aug. 6, 2002

(54) BOLTED JOINT FOR ROTOR DISKS AND METHOD OF REDUCING THERMAL GRADIENTS THEREIN

(75) Inventors: Jason Francis Pepi, Tewksbury; Todd Alan Ebert, Brookline, both of MA (US)

(73) Assignee: General Electric Company, Schenectady, NY (US)

(*) Notice: Subject to any disclaimer, the term of this patent is extended or adjusted under 35 U.S.C. 154(b) by 5 days.

This patent is subject to a terminal disclaimer.

(21) Appl. No.: 09/747,872

(22) Filed: Dec. 22, 2000

(51) Int. Cl.[7] ................................. F01D 5/08
(52) U.S. Cl. .................. 416/96 R; 416/95; 416/198 A; 415/115; 415/189
(58) Field of Search ................... 415/115, 135, 415/178, 189; 416/95, 1, 198 A, 201 R; 411/378, 546, DIG. 2, 399, 383, 395; 403/28, 29, 30

(56) References Cited

U.S. PATENT DOCUMENTS

| | | | | |
|---|---|---|---|---|
| 2,320,398 A | * | 6/1943 | Zetterquist | 411/DIG. 2 |
| 3,199,294 A | * | 8/1965 | Hagen | 415/115 |
| 4,247,248 A | * | 1/1981 | Chaplin et al. | 415/136 |
| 4,309,145 A | * | 1/1982 | Viola | 415/173.7 |
| 4,887,949 A | * | 12/1989 | Dimmick et al. | 403/22 |
| 4,991,390 A | * | 2/1991 | Shah | 415/115 |
| 5,072,785 A | * | 12/1991 | Dressler et al. | 411/546 |
| 5,116,158 A | * | 5/1992 | Carruthers et al. | 411/383 |
| 5,129,447 A | * | 7/1992 | Hamner | 403/23 |
| 5,226,788 A | * | 7/1993 | Fledderjohn | 415/177 |
| 5,779,416 A | * | 7/1998 | Sternitzky | 411/424 |
| 5,848,874 A | * | 12/1998 | Heumann et al. | 415/189 |

* cited by examiner

Primary Examiner—Edward K. Look
Assistant Examiner—Richard Woo
(74) Attorney, Agent, or Firm—Nathan D. Herkamp; Pierce Atwood

(57) ABSTRACT

Rotor disk stress is reduced in a bolted joint for connecting adjacent rotor disks in a gas turbine engine. The bolted joint includes a bolt hole formed in the first rotor disk and a tube disposed in the bolt hole such that a channel is defined between the tube and the bolt hole. A bolt is disposed in the tube such that a gap is defined between the bolt and the tube. The gap thermally insulates the bolt from hot fluid in the channel. A first passage provides fluid communication between the channel and a forward cavity, and a second passage provides fluid communication between the channel and an aft cavity. Hot fluid passing through the channel reduces thermal gradients in the first rotor disk. The tube thermally shields the bolt from the hot fluid to minimize differential thermal growth.

20 Claims, 3 Drawing Sheets

BOLTED JOINT FOR ROTOR DISKS AND METHOD OF REDUCING THERMAL GRADIENTS THEREIN

BACKGROUND OF THE INVENTION

This invention relates generally to gas turbine engines and more particularly to bolted joints for joining adjacent rotor disks in such engines.

A gas turbine engine includes a compressor that provides pressurized air to a combustor wherein the air is mixed with fuel and the mixture is ignited for generating hot combustion gases. These gases flow downstream to one or more turbines that extract energy therefrom to drive the compressor and provide useful work such as powering an aircraft in flight. The compressor and turbine sections each include a plurality of rotor disks that are joined together for rotation about the engine's centerline axis. Each rotor disk comprises a central bore region, a disk rim from which a plurality of radially extending blades are supported, and a web joining the bore and rim. The bore and web are typically much more massive than the disk rim to accommodate the stresses to which the disk is subjected.

Rotating disks, particularly those in the high pressure turbine section of an engine, develop high radial thermal gradients during transient operation because of exposure of the disk rim to hot gases. In this case, the rim of the disk has a quick thermal response (i.e., temperature increase) while the web and bore react more slowly due to their high relative mass and their lower temperature environment. The thermal gradient creates large tangential and radial stresses in the web and bore of the disk that are magnified by any stress concentrations such as holes, fillets and the like.

A significant challenge in disk design is to connect multiple disks together without developing high stresses. One method of connection is through the use of bolted joints connecting adjacent disks. Often, at least one of the disks must be bolted through the disk web because of space limitations. In such instances, the bolt holes are located in regions of high thermal gradient and produce high concentrated stresses. This limits the allowable time of operation of the rotor hardware.

One approach to reducing bolt hole stress is to pass relatively hot secondary flow path air (such as compressor discharge air) through each bolt hole to heat the disk from inside the bolt hole. In doing so, the temperature distribution in the area of the bolt hole is made more uniform and the stress is dramatically reduced. While there is a significant benefit to hardware life with this approach, there are also drawbacks. One primary drawback of delivering air through the bolt holes for heating the disk is that during engine transients such as acceleration, the bolts used to clamp the joint together heat up extremely quickly relative to the disk. This thermal mismatch causes the bolts to outgrow the disk in the direction parallel to their axes. This differential axial growth results in a loss of clamp load in the bolts during operation and can potentially pose a low cycle fatigue problem in the bolts. One solution to clamp load loss is to simply increase the clamp load that is originally provided at assembly. However, in many instances the axial load is originally established with respect to the yield strength of the bolt material so that it is not possible to increase assembly clamp load without risk yielding the bolt or aggravating a low cycle fatigue problem.

Accordingly, there is a need for a bolted joint in which bolt hole stresses are reduced while minimizing the problems of clamp load loss and low cycle fatigue.

BRIEF SUMMARY OF THE INVENTION

The above-mentioned need is met by the present invention, which provides a bolted joint for connecting first and second rotor disks in a gas turbine engine. The bolted joint includes a bolt hole formed in the first rotor disk and a tube disposed in the bolt hole such that a channel is defined between the tube and the bolt hole. A bolt is disposed in the tube such that a gap is defined between the bolt and the tube. The gap thermally insulates the bolt from hot fluid in the channel. A first passage provides fluid communication between the channel and a forward cavity, and a second passage provides fluid communication between the channel and an aft cavity. Hot fluid passing through the channel reduces thermal gradients in the first rotor disk. The tube thermally shields the bolt from the hot fluid to minimize differential thermal growth.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
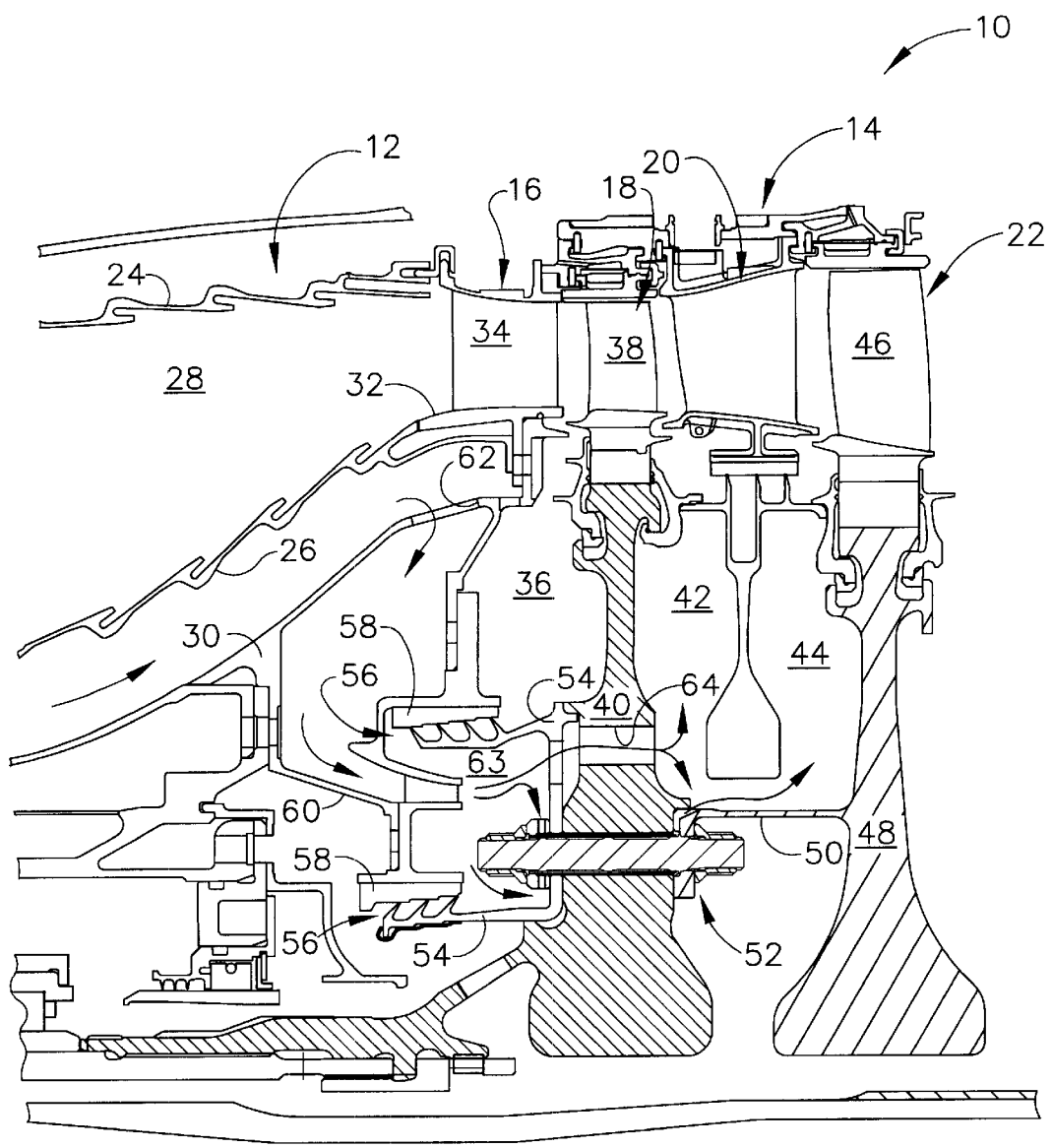
FIG. 1 is a partial cross-sectional view of a gas turbine engine having the bolted joint of the present invention.

Referring to the drawings wherein identical reference numerals denote the same elements throughout the various views, FIG. 1 shows a portion of a gas turbine engine 10 having, among other structures, a combustor 12 and a turbine section 14 located downstream of the combustor 12. The turbine section 14 includes a first stage nozzle assembly 16, a first stage turbine rotor 18, a second stage nozzle assembly 20 and a second stage turbine rotor 22 arrange sequentially along the engine centerline axis. The combustor 12 includes a generally annular hollow body having an outer liner 24 and an inner liner 26 defining a combustion chamber 28 therein. A compressor (not shown) provides compressed air that passes primarily into the combustor 12 to support combustion and partially around the combustor 12 where it is used to cool both the combustor liners 24, 26 and turbomachinery further downstream. Fuel is introduced into the forward end of the combustor 12 and is mixed with the air in a conventional fashion. The resulting fuel-air mixture flows into the combustion chamber 28 where it is ignited for generating hot combustion gases. The hot combustion gases are discharged to the turbine section 14 where they are expanded so that energy is extracted.

The first stage nozzle assembly 16 includes an inner nozzle support 30 to which a plurality of circumferentially adjoining nozzle segments 32 is mounted. The nozzle segments 32 collectively form a complete 360° assembly. Each segment 32 has two or more circumferentially spaced vanes 34 (one shown in FIG. 1) over which the combustion gases flow. The vanes 34 are configured so as to optimally direct the combustion gases to the first stage turbine rotor 18. The inner nozzle support 30 is a stationary member suitably supported in the engine 10.

The first stage turbine rotor 18 is located aft of the first stage nozzle assembly 16 and is spaced axially therefrom so as to define a first wheel cavity 36. The first stage turbine rotor 18 includes a plurality of turbine blades 38 (one shown in FIG. 1) suitably mounted to a first rotor disk 40 and radially extending into the turbine flow path. The second stage nozzle assembly 20 is located aft of the first stage turbine rotor 18, and the second stage turbine rotor 22 is located aft of the second stage nozzle assembly 20 so as to define second and third wheel cavities 42 and 44, respectively. The second stage turbine rotor 22 includes a plurality of turbine blades 46 (one shown in FIG. 1) suitably mounted to a second rotor disk 48 and radially extending into the turbine flow path. The second rotor disk 48 has a forward extending flange 50 that is joined to the aft side of the first rotor disk 40 at a bolted joint 52. Thus, the first and second rotor disks 40, 48 are arranged to rotate together about the engine centerline axis.

An annular rotating seal member 54 is fixed to the forward side of the first rotor disk 40 for rotation therewith by the bolted joint 52. The rotating seal member 54 contacts the inner nozzle support 30 to form one or more forward seals 56 for sealing the compressor discharge air that is bled off for cooling purposes from the hot gases in the turbine flow path. In one preferred embodiment, the forward seals 56 are rotating labyrinth seals, each including a plurality of thin, tooth-like projections extending radially outward from the stationary seal member 56. The outer circumference of each projection rotates within a small tolerance of the inner circumference of a corresponding annular stationary seal member 58 mounted on the inner nozzle support 30, thereby effecting sealing between the cooling air and the hot gases in the turbine flow path.

The nozzle assembly 16 also includes an accelerator 60 disposed radially between the two forward seals 56. The accelerator 60 is an annular member that defines an internal air plenum. High pressure compressor discharge air is fed to the accelerator 60 via air holes 62 formed in the inner nozzle support 30. The high pressure-air passes axially through the accelerator 60 and is discharged therefrom through a plurality of aft nozzles into a chamber or cavity 63 located forward of the first rotor disk 40. A portion of this air passes through passages 64 formed in the first rotor disk 40 for cooling turbomachinery further downstream. As will be described in more detail below, some of this high pressure air is directed through the bolted joint 52 for reducing the thermal gradient in the first rotor disk 40 and thereby reducing disk transient stresses.

Figure 2:
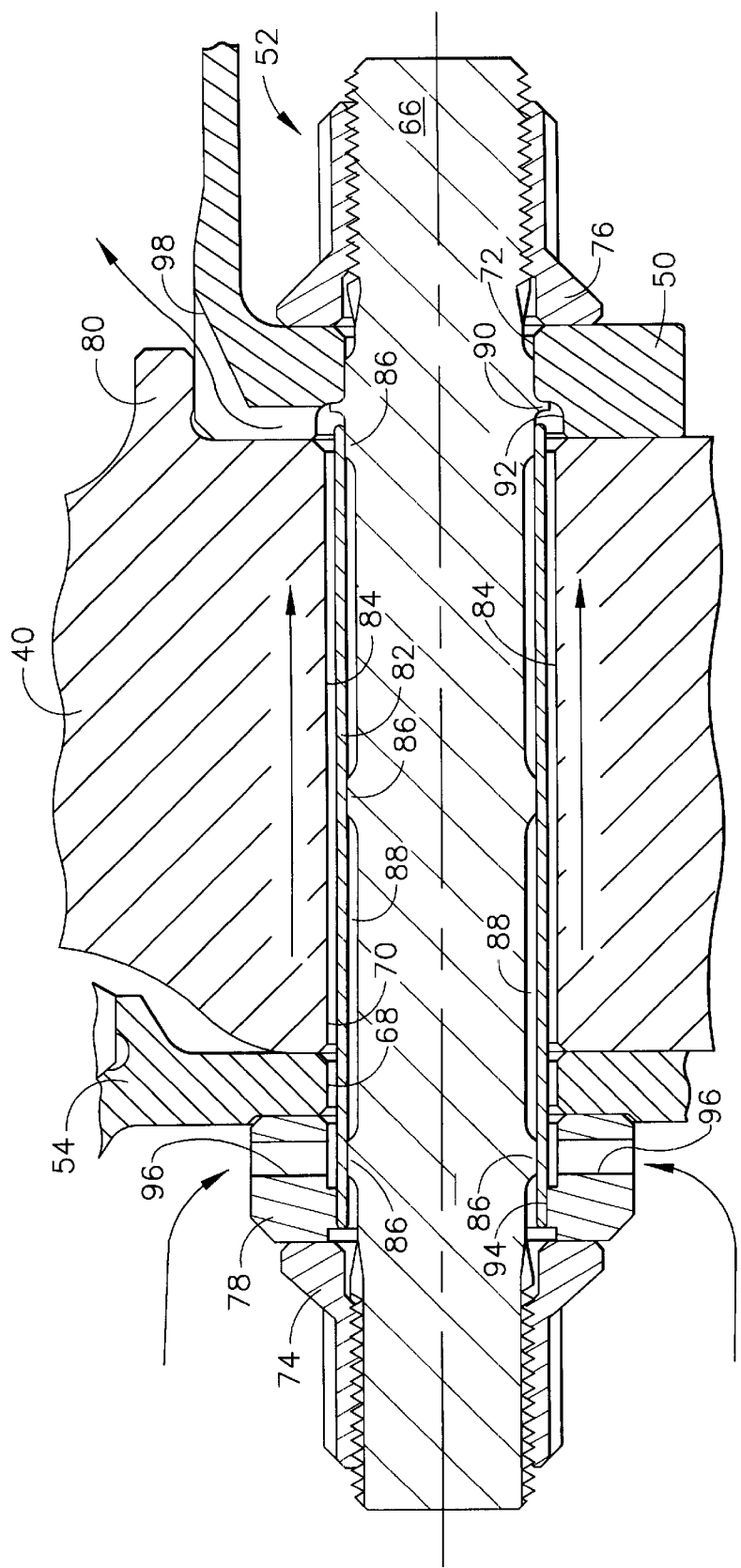
FIG. 2 is an enlarged cross-sectional view of the bolted joint of FIG. 1.

Referring now to FIG. 2, the bolted joint 52 is described in more detail. The bolted joint 52 comprises a bolt 66 extending axially through a first opening 68 in the rotating seal member 54, a bolt hole 70 in the first rotor disk 40, and a second opening 72 in the second rotor disk flange 50. Both ends of the bolt 66 are threaded so that a first nut 74 is threadingly received on the forward end of the bolt 66 and a second nut 76 is threadingly received on the aft end of the bolt 66. A washer or spacer 78 is disposed on the bolt 66 between the first nut 74 and the rotating seal member 54. The first nut 74 and the spacer 78 act as a fixed abutment against the rotating seal member 54, and the second nut 76 is a fixed abutment against the second rotor disk flange 50. Thus, when the nuts 74, 76 are suitably tightened, the first rotor disk 40, the second rotor disk 48 and the rotating seal member 54 are joined together for rotation about the engine centerline axis. As an alternative, one of the first or second nuts 74, 76 could be replaced with a head integrally formed on the corresponding end of the bolt 66 so that clamping would be accomplished by the integral head and a single nut instead of two threaded nuts.

An annular flange 80 extends axially from the aft side of the first rotor disk 40. The radially inner surface of the annular flange 80 engages a radially outer surface of the second rotor disk flange 50 so as to establish a rabbet joint therebetween. This rabbet joint radially locates the second rotor disk 48 with respect to the first rotor disk 40.

The bolted joint 52 also includes a tube 82 disposed in the bolt hole 70 and extending from just beyond the aft end of the bolt hole 70, through the first opening 68 and into the bore of the spacer 78. The tube 82 is sized so as to have an annular, axially extending channel 84 formed thereabout. Specifically, the tube 82 has a lesser diameter than its surrounding structure; i.e., the bore of the spacer 78, the first opening 68 and the bolt hole 70. Accordingly, the channel 84 is defined by the gap between the tube 82 and its surrounding structure.

The bolt 66 is disposed in the tube 82 and, except for a number of raised shoulders 86 formed thereon, has an outside diameter that is less than the inside diameter of the tube 82 so as to define an air gap 88 between the bolt 66 and the tube 82. The aft-most raised shoulder 86 has an axial retention lip 90 formed on the outer circumference thereof. The axial retention lip 90 abuts a recess 92 formed in the forward face of the second rotor disk flange 50 and coaxial with the second opening 72. This axially locates the bolt 66 with respect to the first and second rotor disks 40, 48, thereby facilitating assembly of the bolted joint 52, which is normally a blind assembly. The tube 82, which is made of any suitable material such as a nickel-based alloy like Inconel, is supported by the raised shoulders 86 on the bolt 66. Preferably, the tube 82 is swaged or crimped at one end to a raised shoulder 94 formed in the bore of the spacer 78 and at the other end to the aft-most raised shoulder 86. Alternatively, the tube 82 may be allowed to move freely in the axial direction in the bolt hole 70.

One or more radial inlet passages 96 are formed in the spacer 78 for providing fluid communication between the forward cavity 63 and the channel 84. Similarly, one or more radial outlet passages 98 are formed in the second rotor disk flange 50 for providing fluid communication between the second and third wheel cavities 42, 44 and the channel 84, via the flange recess 92.

In operation, compressor discharge air delivered to the forward cavity 63 from the accelerator 60 flows through the inlet passages 96 in the spacer 78 into the forward end of the channel 84. This air passes through the bolt hole portion of the channel 84 due to the pressure differential between the forward cavity 63 and the second and third wheel cavities 42, 44. The air is then discharged through the outlet passages 98 to the second and third wheel cavities 42, 44 where it rejoins the compressor discharge air that has passed through the passages 64 and contributes to cooling turbomachinery further downstream. As the compressor discharge air (which is generally hotter than the web and core of the first rotor disk 40) flows through the bolt hole portion of the channel 84, it heats the first rotor disk 40 in the area around the bolt hole 70. At the same time, the tube 82 acts as a thermal shield for the bolt 66. That is, the air gap 88 functions as an insulating medium and also eliminates a conduction mechanism between the tube 82 and the bolt 66. Accordingly, the bolt 66 does not heat up extremely quickly relative to the first rotor disk 40, thereby avoiding differential thermal growth relative the disk 40.

By heating the first rotor disk 40, the compressor discharge air increases the thermal response of the disk's web and bore, thereby decreasing the thermal gradient between the web and bore and the disk's rim. This reduction in thermal gradient will cause a reduction in unconcentrated thermal operating stresses and result in increased hardware life. Furthermore, the thermal shielding provided by the tube 82 will prevent differential thermal growth of the bolt 66 such that stress reduction can be achieved without experiencing a loss of clamp load and low cycle fatigue problems. The amount of air delivered to the bolt hole 70 is determined by the size of the inlet and outlet passages 96, 98. Thus, the amount of air needed to produce the desired degree of disk heating for a given system can be achieved by tightly controlling the sizes of the inlet and outlet passages 96, 98.

Figure 3:
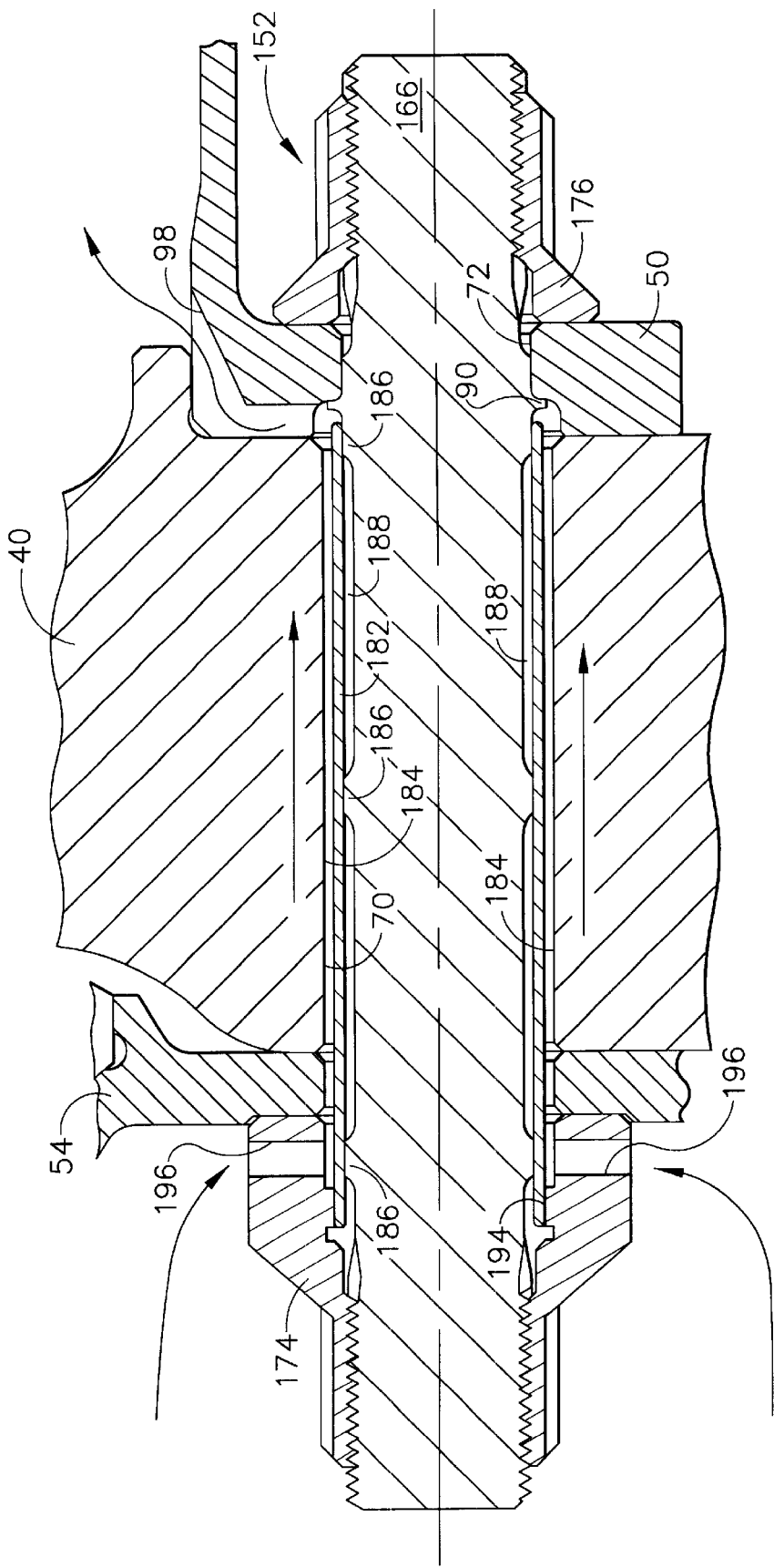
FIG. 3 is an enlarged cross-sectional view of a second embodiment of a bolted joint.

Turning to FIG. 3, an alternative embodiment is shown. In this case, a bolted joint 152 comprises a bolt 166 extending axially through a first opening 68 in the rotating seal member 54, a bolt hole 70 in the first rotor disk 40, and a second opening 72 in the second rotor disk flange 50. Both ends of the bolt 166 are threaded so that a first nut 174 is threadingly received on the forward end of the bolt 166 and a second nut 176 is threadingly received on the aft end of the bolt 166. The first nut 174 is a fixed abutment against the rotating seal member 54, and the second nut 176 is a fixed abutment against the second rotor disk flange 50. Thus, when the nuts 174, 176 are suitably tightened, the first rotor disk 40, the second rotor disk 48 and the rotating seal member 54 are joined together for rotation about the engine centerline axis. As an alternative, the second nut 176 could be replaced with a head integrally formed on the aft end of the bolt 166 so that clamping would be accomplished by the integral head and the first nut 174 instead of two threaded nuts.

As in the first embodiment, the bolted joint 152 includes a tube 182 disposed in the bolt hole 70 and extending from just beyond the aft end of the bolt hole 70, through the first opening 68 and into the bore of the first nut 174. The tube 182 is sized so as to have an annular, axially extending channel 184 formed thereabout. Specifically, the tube 182 has a lesser diameter than its surrounding structure; i.e., the bore of the first nut 174, the first opening 68 and the bolt hole 70. Accordingly, the channel 184 is defined by the gap between the tube 182 and its surrounding structure. The bolt 166 is disposed in the tube 182 and, except for a number of raised shoulders 186 formed thereon, has an outside diameter that is less than the inside diameter of the tube 182 so as to define an air gap 188 between the bolt 166 and the tube 182. The tube 82 is preferably swaged or crimped at one end to a raised shoulder 194 formed in the bore of the first nut 174 and at the other end to the aft-most raised shoulder 86. The bolt 166 and the tube 182 are otherwise the same as the bolt and tube of the first embodiment and consequently are not described in further detail here.

The bolted joint 152 differs from the first embodiment in that there is no spacer disposed between the first nut 174 and the rotating seal member 54. Therefore, the radial inlet passages cannot be formed in the spacer. Instead, one or more radial inlet passages 196 are formed in the first nut 174 for providing fluid communication between the forward cavity 63 and the channel 184. As in the first embodiment, one or more radial outlet passages 98 are formed in the second rotor disk flange 50 for providing fluid communication between the second and third wheel cavities 42, 44 and the channel 184, via a recess 92 formed in the second rotor disk flange 50. Thus, compressor discharge air will flow into the channel 184 through the inlet passages 196 and out of the channel 184 through the outlet passages 98. The compressor discharge air will heat the first rotor disk 40 in the area around the bolt hole 70 as it flows through the bolt hole portion of the channel 184. The tube 182 will insulate the bolt 166 from the hot air and prevent differential thermal growth such that stress reduction can be achieved without experiencing a loss of clamp load and low cycle fatigue problems.

In either of the two embodiments described above, the air gap between the tube and the bolt could be filled with a flexible insulation material to insulate the bolt. In addition, the bolt could be provided with a known thermal barrier coating to supplement the thermal shielding of the tube.

The foregoing has described a bolted joint that increases the thermal response of the disk web and bore through use of a parallel air delivery system. The increased thermal response reduces the thermal gradient in the rotor disk, which in turn reduces disk transient stresses. The bolt is thermally insulated to minimize loss of clamp load and low cycle fatigue problems. While specific embodiments of the present invention have been described, it will be apparent to those skilled in the art that various modifications thereto can be made without departing from the spirit and scope of the invention as defined in the appended claims.

What is claimed is:

1. A bolted joint for connecting first and second components, said bolted joint comprising:
   a bolt hole formed in said first component;
   a tube disposed in said bolt hole, wherein a channel is defined between said tube and said bolt hole;
   a bolt disposed in said tube, wherein a gap is defined between said bolt and said tube and said gap thermally insulates said bolt from hot fluid in said channel;
   a first passage providing fluid communication between said channel and a first exterior cavity;
   a second passage providing fluid communication between said channel and a second exterior cavity; and
   an abutment disposed on one end of said bolt, said first passage being formed in said abutment, wherein said tube is joined to said abutment.

2. The bolted joint of claim 1 wherein said abutment comprises a nut threadingly received on one end of said bolt and a spacer disposed on said bolt adjacent to said nut, said first passage being formed in said spacer.

3. The bolted joint of claim 2 wherein said tube is joined to said spacer.

4. The bolted joint of claim 2 wherein said second passage is formed in said second component.

5. The bolted joint of claim 1 wherein said abutment comprises a nut threadingly received on one end of said.

6. The bolted joint of claim 5 wherein said tube is joined to said nut.

7. The bolted joint of claim 5 wherein said second passage is formed in said second component.

8. The bolted joint of claim 1 wherein said bolt has at least one raised shoulder formed thereon for supporting said tube.

9. The bolted joint of claim 1 further comprising a retention lip formed on said bolt and abutting said second component.

10. In a gas turbine engine comprising a first rotor disk, a second rotor disk, a first cavity adjacent to said first rotor disk, and a second cavity adjacent to said second rotor disk, a bolted joint for connecting said first and second rotor disks, said bolted joint comprising:

a bolt hole formed in said first rotor disk;

a tube disposed in said bolt hole, wherein a channel is defined between said tube and said bolt hole;

a bolt disposed in said tube, wherein a gap is defined between said bolt and said tube and said gap thermally insulates said bolt from hot fluid in said channel;

a first passage providing fluid communication between said first cavity and said channel;

a second passage providing fluid communication between said second cavity and said channel; and an abutment disposed on one end of said bolt, said first passage being formed in said abutment, wherein said tube is joined to said abutment.

11. The bolted joint of claim 10 wherein said abutment comprises a nut threadingly received on one end of said bolt and a spacer disposed on said bolt adjacent to said nut, said first passage being formed in said spacer.

12. The bolted joint of claim 11 wherein said tube is joined to said spacer.

13. The bolted joint of claim 11 wherein said second passage is formed in said second rotor disk.

14. The bolted joint of claim 10 wherein said abutment comprises a nut threadingly received on one end of said bolt.

15. The bolted joint of claim 14 wherein said tube is joined to said nut.

16. The bolted joint of claim 14 wherein said second passage is formed in said second rotor disk.

17. The bolted joint of claim 10 wherein said bolt has at least one raised shoulder formed thereon for supporting said tube.

18. The bolted joint of claim 10 further comprising a retention lip formed on said bolt and abutting said second rotor disk.

19. In a gas turbine engine having a bolted joint for connecting a first rotor disk and a second rotor disk wherein said bolted joint includes a bolt disposed in a bolt hole formed in said first rotor disk, a method of reducing thermal gradients in said first rotor disk comprising:

providing a channel between said bolt and said bolt hole;

causing a to pass through said channel, wherein said fluid is hotter than a surrounding portion of said first rotor disk; and insulating said bolt from said hot fluid in said channel.

20. The method of claim 19 wherein said relatively hot fluid is compressor discharge air.

* * * * *